United States Patent
Clark

(10) Patent No.: US 9,509,153 B2
(45) Date of Patent: Nov. 29, 2016

(54) PORTABLE MULTIPLE MOBILE ELECTRONIC DEVICE CHARGING STATION

(71) Applicant: Kenneth E. Clark, Celebration, FL (US)

(72) Inventor: Kenneth E. Clark, Celebration, FL (US)

(73) Assignee: Kenneth E. Clark, Celebration, FL (US)

( * ) Notice: Subject to any disclaimer, the term of this patent is extended or adjusted under 35 U.S.C. 154(b) by 213 days.

(21) Appl. No.: 13/998,785

(22) Filed: Dec. 9, 2013

(65) Prior Publication Data

US 2015/0162760 A1    Jun. 11, 2015

(51) Int. Cl.
*H02J 7/00*    (2006.01)

(52) U.S. Cl.
CPC ............ *H02J 7/0027* (2013.01); *H02J 7/0042* (2013.01); *H02J 7/0045* (2013.01); *H02J 7/0054* (2013.01); *H02J 7/0055* (2013.01)

(58) Field of Classification Search
CPC ..... Y02E 60/12; H02J 7/0054; H02J 7/1423; H02J 7/0042; H02J 7/0045; H02J 7/0044; H01M 10/44; H01M 10/46; H01M 2/1022
USPC ......................................................... 320/103
See application file for complete search history.

(56) References Cited

U.S. PATENT DOCUMENTS

| | | | | |
|---|---|---|---|---|
| 5,272,747 A * | 12/1993 | Meads | ................ | H04W 88/021 194/344 |
| 2003/0025476 A1* | 2/2003 | Trela | ..................... | H02J 7/0003 320/107 |
| 2007/0024236 A1* | 2/2007 | Arakelian | ........... | H01M 2/1072 320/107 |
| 2007/0247105 A1* | 10/2007 | Krieger | ................. | H02J 7/0006 320/104 |
| 2007/0273325 A1* | 11/2007 | Krieger | ............... | H01M 2/1027 320/106 |
| 2011/0175569 A1* | 7/2011 | Austin | ................ | B60L 11/1824 320/109 |
| 2012/0062180 A1* | 3/2012 | Nakamura | .......... | H01M 2/0202 320/134 |
| 2013/0041730 A1 | 2/2013 | Lobianco | | |
| 2013/0043827 A1 | 2/2013 | Weinstein | | |
| 2013/0234644 A1 | 9/2013 | Weeks | | |
| 2013/0320913 A1 | 12/2013 | Chen | | |
| 2014/0333263 A1* | 11/2014 | Stewart | ................. | H02J 7/0052 320/111 |
| 2015/0035472 A1* | 2/2015 | Yang | ..................... | H02J 7/0042 320/103 |

FOREIGN PATENT DOCUMENTS

| | | |
|---|---|---|
| WO | 2012066407 A1 | 5/2012 |
| WO | WO 2012066407 | 5/2012 |

* cited by examiner

*Primary Examiner* — Arun Williams
(74) *Attorney, Agent, or Firm* — Kristin Mazany Nevins; Offit Kurman, P.C.

(57) ABSTRACT

Compact and portable station for charging multiple mobile devices is described, embodiments of the station include: an interlocking charging base, connectable to up to six bases with one $120V_{AC}$ to $12V_{DC}$ inverter cord; a self-contained main housing to include a cord housing with eight 2-foot spooled retractable cords, ports to recharge eight mobile devices simultaneously, a rechargeable 12-volt lithium ion battery to transfer $5V_{DC}$ from the rechargeable battery to each mobile device. The unit is intended for use in public places for customer convenience and offering businesses advertising space.

4 Claims, 5 Drawing Sheets

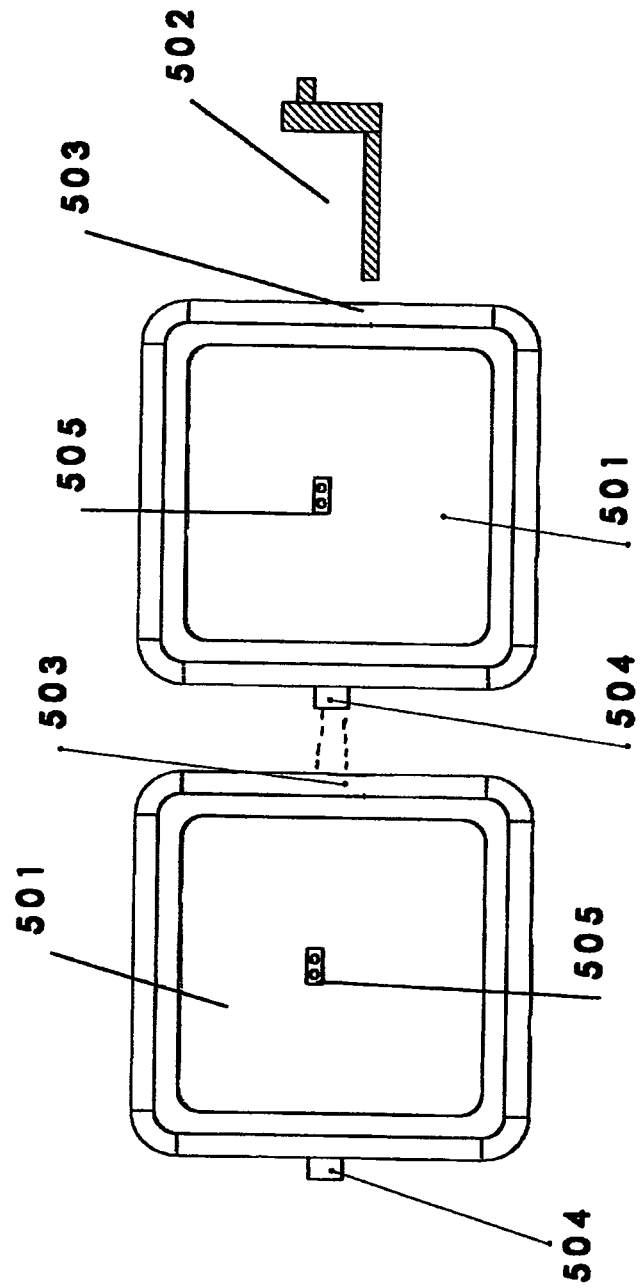

PORTABLE MULTIPLE MOBILE ELECTRONIC DEVICE CHARGING STATION

BACKGROUND TO THE INVENTION

Current mobile phones use more battery power for all of the applications and the battery life of the phone is depleted rapidly causing the need to recharge the device more often. Typically a person does not carry a charging device with them and if so they do not have access to a power outlet. The present invention for charging mobile phones in public places will offer a much needed convenience. The adverting space offers businesses an incentive to offer the convenience.

SUMMARY OF THE INVENTION

The portable multiple mobile electronic device charging station, is a rechargeable unit for charging mobile electronic devices. The portable multiple mobile electronic device charging station, hereafter referred to as charging station, is capable of providing a full charge for up to eight mobile devices simultaneously or individually, providing convenient mobile charging at public places. The charging station can be covered with wraps or silk screening for advertising. The charging station has a housing, a 12-volt lithium ion battery located within the housing and eight interface ports on the housing configured to enable charging of multiple mobile devices from the battery charger simultaneously. Cord housing contains eight two-foot retractable cords to connect mobile devices for charging. The charging station rests on a charging base, which charges the 12-volt lithium ion battery contained within the charging station. The charging base contains one male and one female adapter to connect up to six charging bases via a $120V_{AC}$ to $12V_{DC}$ inverter cord. The present invention relates to a battery powered station for charging up to eight mobile devices in public places with advertising.

BRIEF DESCRIPTION OF THE DRAWINGS

FIG. 5. Front view diagram showing the interlocking bases of the present invention.

DETAILED DESCRIPTION OF THE DRAWINGS

Figure 1:
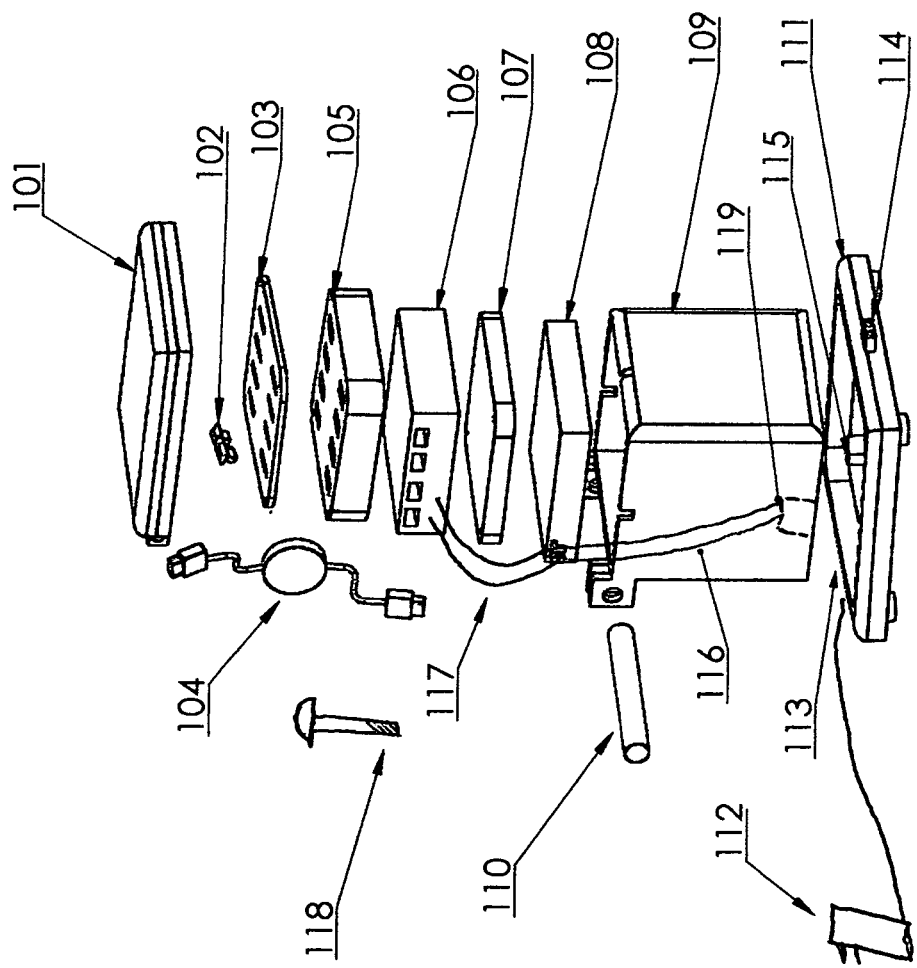
FIG. 1. Exploded view diagram showing the detailed embodiment of the present invention.

FIG. 1 represents a portable multiple mobile electronic device charging station detailed embodiment of the present invention. The portable multiple mobile electronic device charging station is intended to charge mobile devices in public places while providing advertisement space. The portable multiple mobile electronic device charging station typically uses a charging base 111 to charge the rechargeable 12-volt lithium ion battery 108 that is mounted in main housing 109, that is covered by divider plate 107 that main charging board 106 is mounted to covered by a cord housing 105, that retractable cord 104 mounts inside of and that plugs into main charging board 106, the opposite end of retractable cord 104 goes through faceplate 103 and held in place by plastic filler 102 that snaps into faceplate 103 to prevent over retracting, main housing 109 is covered by lid 101 that is mounted together by connector pin 110 with wiring harness 116 connecting female receiver 119 to the rechargeable 12-volt lithium ion battery 108, connecting wire 117 connects rechargeable 12-volt lithium ion battery 108 to main charging board 106, electrical cord 112 inserts into input connector 113 making it capable to plug into a wall outlet, output connector 114 is available to insert into additional stations to interlock them and transfer power though multiple units with one power supply, screws 118 will pass though parts, faceplate 103, cord housing 105, divider plate 107, and screws into main housing 109, female receiver 119 connects to charging mount 115.

Figure 2:
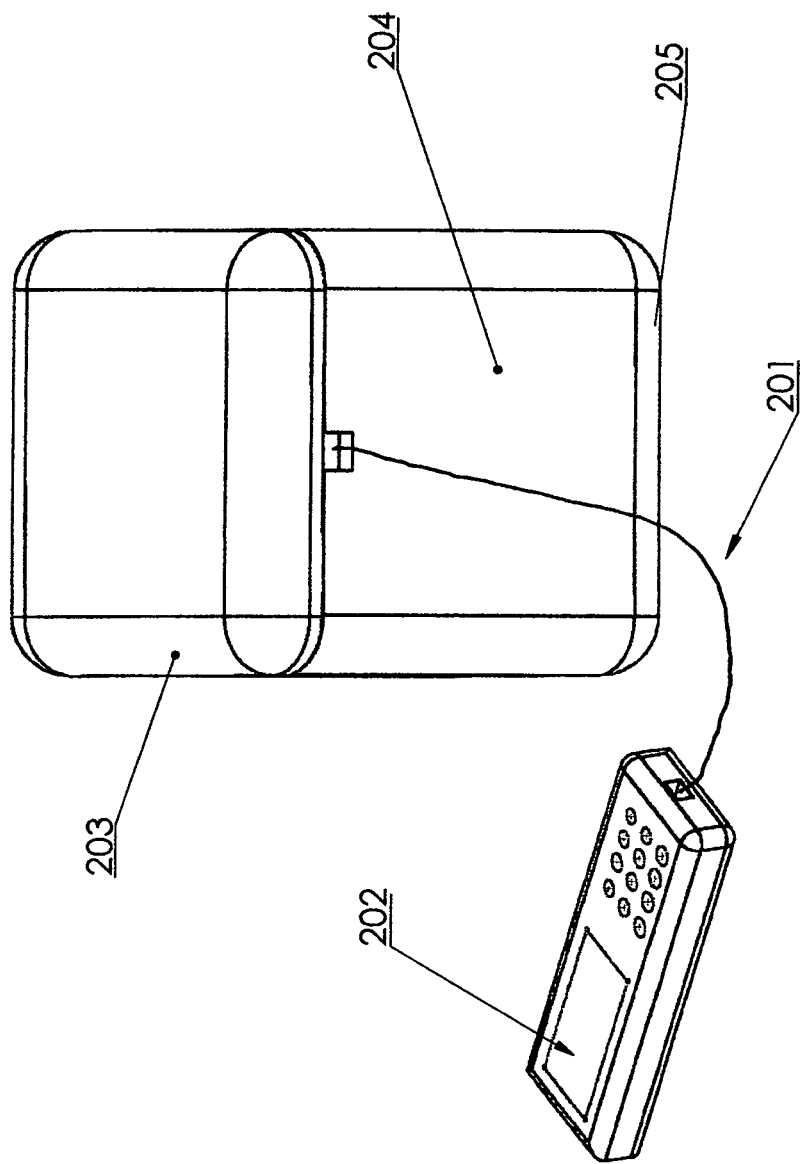
FIG. 2. Front view diagram showing the present invention in use.

FIG. 2 shows the present invention in use, typically uses retractable cord 201 from main housing 205 that is covered by lid 203, plugging into electronic device 202 while displaying an advertisement on advertising space 204.

Figure 3:
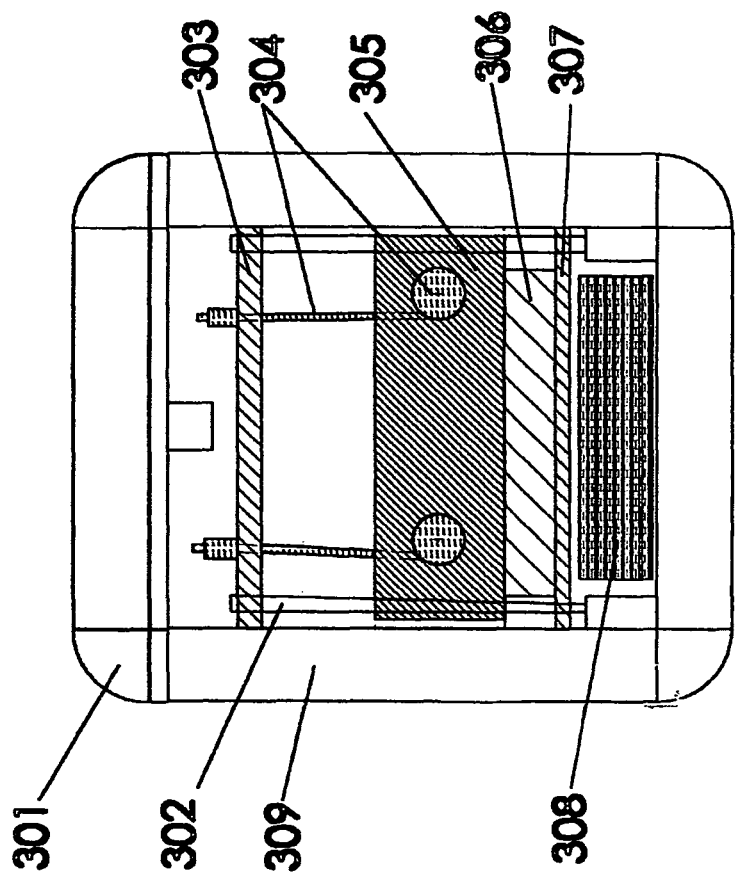
FIG. 3. Cross Section view Diagram showing the internal layout of the present invention.

FIG. 3 shows a cross section of the station ready for use, typically containing faceplate 303 that retractable cord 304 protrudes though that is mounted in cord housing 305 that sits on main charging board 306 that mounts onto divider plate 307 that covers rechargeable 12-volt lithium ion battery 308 which is secured in place by screws 302 going through faceplate 303, cord housing 305, divider plate 307 and mounts to main housing 309 which is contained under lid 301.

Figure 4:
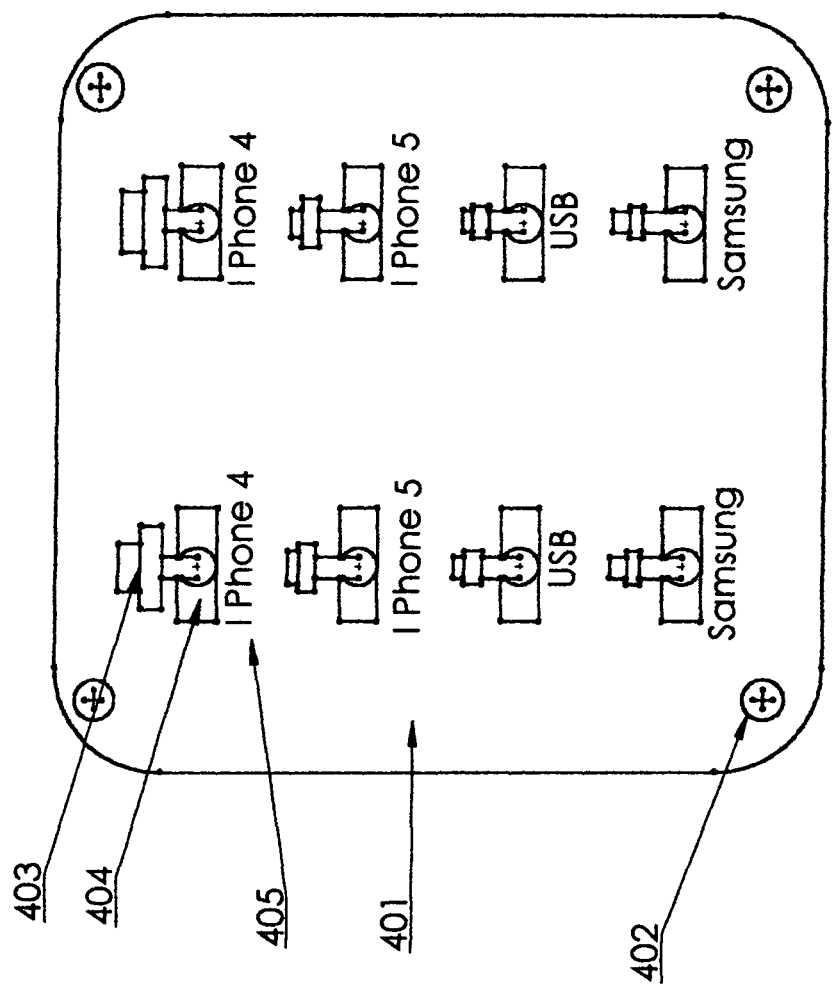
FIG. 4. Top view of the present invention without lid showing details.

FIG. 4 shows detail of the top of station typical containing faceplate 401 attached to station by screws 402 with retractable cord 403 protruding through and secured by plastic filler 404 with cord label 405 identifying the different cord options.

FIG. 5 shows the details of the charging base with a front view diagram showing the interlocking bases of the present invention typically containing a charging base 501 which connects to a power outlet by the electrical cord 502 supplying power into the input connector 503 for a charging station to be placed on battery connector 505, if multiple bases are connected, power supplied to next charging base 501 by output connector 504 inserted into the next input connector 503.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A portable charging station for charging multiple mobile electronic devices, comprising: a main housing configured as a cube comprising a bottom, and a hinged top opposite the bottom, wherein is housed within the cube:

a rechargeable 12-volt lithium ion battery positioned at the bottom of the cube abutting an inner bottom face of the cube, a divider plate stacked on top of the rechargeable 12-volt lithium ion battery, a main charging board stacked on top of the divider plate, a cord housing compartment stacked on top of the main charging board, a faceplate stacked on top of the cord housing compartment, the faceplate comprising eight interface ports, the faceplate configured to enable charging of connected electronic devices from the battery simultaneously up to the required 5VDc per device, and wherein the cord housing compartment is configured with eight retractable cords, each cord extending from the cord housing compartment and connected at a first end to the main charging board and at a second end positioned through the faceplate at a corresponding interface port, and extending through the faceplate for connection with one of the multiple portable electronic devices, and wherein the divider plate, main charging board, cord housing compartment, and faceplate are mounted in vertical arrangement from the bottom to the top of the cube, and wherein the hinged top of the cube comprises a lid.

2. The portable charging station of claim 1, further comprising:

an outer layer comprised of a wrap or a silk screening adhered on all or a portion of the exterior of the charging station, the wrap or silk screening comprising a printed advertisement.

3. The portable charging station of claim 1, wherein the cord housing is an enclosed casing for holding eight interface ports and eight retractable cords comprising: eight interface ports wherein up to eight mobile devices can be connected and charged simultaneously; spools of cords used for charging mobile devices extendable up to two feet that can be replaced upon evolving technology requirements.

4. The cord housing of claim 3, wherein the cord spool is a mechanism for retracting cords used for charging mobile devices comprising: a single-sided spool, wherein a mobile device charging cord is extendable up to two feet and is retractable.

* * * * *